United States Patent
Epsztein et al.

(10) Patent No.: US 10,890,279 B2
(45) Date of Patent: Jan. 12, 2021

(54) METHOD FOR PRESSURIZING THE INNER FLOW SPACE OF A FLEXIBLE PIPE INTENDED FOR TRANSPORTING HYDROCARBONS

(71) Applicant: TECHNIP FRANCE, Courbevoie (FR)

(72) Inventors: Thomas Epsztein, Voillecomte (FR); Nadège Brusselle-Dupend, Rueil Malmaison (FR); Xavier Lefebvre, Conflans-Sainte-Honorine (FR)

(73) Assignee: TECHNIP FRANCE

( * ) Notice: Subject to any disclaimer, the term of this patent is extended or adjusted under 35 U.S.C. 154(b) by 336 days.

(21) Appl. No.: 15/770,328

(22) PCT Filed: Oct. 26, 2016

(86) PCT No.: PCT/EP2016/075753
§ 371 (c)(1),
(2) Date: May 3, 2018

(87) PCT Pub. No.: WO2017/072155
PCT Pub. Date: May 4, 2017

(65) Prior Publication Data
US 2018/0313473 A1 Nov. 1, 2018

(30) Foreign Application Priority Data
Oct. 27, 2015 (FR) .................................. 15 60255

(51) Int. Cl.
*F16L 11/08* (2006.01)
*G01M 3/28* (2006.01)
(Continued)

(52) U.S. Cl.
CPC .......... *F16L 11/083* (2013.01); *F16L 11/081* (2013.01); *G01M 3/04* (2013.01); *G01M 3/2815* (2013.01); *B29C 48/09* (2019.02); *B29C 53/582* (2013.01)

(58) Field of Classification Search
CPC ........ F16L 11/083; F16L 11/081; F16L 11/08; G01M 3/04; G01M 3/2815; G01M 3/28;
(Continued)

(56) References Cited

U.S. PATENT DOCUMENTS

| 6,497,290 B1* | 12/2002 | Misselbrook ......... E21B 17/203 166/384 |
| 2013/0276930 A1* | 10/2013 | Harries ............... B29C 48/0021 138/109 |
| 2016/0243742 A1* | 8/2016 | Fernando ................ F16L 11/08 |

FOREIGN PATENT DOCUMENTS

| CN | 101208554 A | 6/2008 |
| CN | 101626883 A | 1/2010 |

(Continued)

OTHER PUBLICATIONS

American Petroleum Institute Specification 17J (Specification for Unbonded Flexible Pipe; 4th edition) (Year: 2014).*
(Continued)

*Primary Examiner* — Leith S Shafi
*Assistant Examiner* — Inja Song
(74) *Attorney, Agent, or Firm* — Ostrolenk Faber LLP

(57) ABSTRACT

The present application relates to a method for pressurizing the inner flow space of an underwater flexible pipe intended for transporting hydrocarbons, comprising the following steps:
a) providing a flexible pipe comprising a reinforcing layer made up of a short-pitch winding of at least one metal wire with noncontiguous turns around a thermoplastic polymer sheath defining an inner space, then
(Continued)

b) filling the inner space of the flexible pipe with an oil, then c) increasing the inner pressure Pi of the flexible pipe to at least 10 MPa, the inner pressure being exerted by said oil, then d') maintaining the inner pressure Pi of the flexible pipe at a pressure of at least 10 MPa for a time D of at least one minute, characterized in that said oil has a kinematic viscosity at 40° C., measured according to the ASTM D445 standard, of more than 10 mm$^2$/s. This method makes it possible to reduce, or even prevent, the appearance of cavitation and crazing on the polymer sheath.

17 Claims, 4 Drawing Sheets

(51) Int. Cl.
*G01M 3/04* (2006.01)
*B29C 48/09* (2019.01)
*B29C 53/58* (2006.01)

(58) Field of Classification Search
CPC .... G01M 5/0025; B29C 48/09; B29C 53/582; G01N 3/12
See application file for complete search history.

(56) References Cited

FOREIGN PATENT DOCUMENTS

| EP | 2 653 288 A1 | 10/2013 |
| EP | 2 653 291 A1 | 10/2013 |
| WO | WO 2006/120320 A1 | 11/2006 |
| WO | WO 2015/025095 A1 | 2/2015 |

OTHER PUBLICATIONS

Material Specification of Synfluid® mPAO 100 cSt (Year: 2013).*
Flexibles Brochure of National Oilwell Varco (with a supporting document of wayback page) (Year: 2015).*
Britannica Encyclopedia (search for "petroleum" https://www.britannica.com/science/petroleum) (Year: 2013).*
"Fluid Properties Viscosity Part 1";• Oil and Gas Separator; "http://www.oilngasseparator.info/oil-handling-surfacefacilities/fluid-properties/fluid-..." (2009) 2 pages.
International Search Report dated Jan. 31, 2017 in corresponding PCT International Application No. PCT/EP2016/075753.
Written Opinion dated Jan. 31, 2017 in corresponding PCT International Application No. PCT/EP2016/075753.
Preliminary Search Report dated Aug. 12, 2016 in corresponding French Patent Application No. 1560255.
Anonymous, "Figure 6-4. Viscosity-temperature graph for crude oils (courtesy of ASTM D-341)," Oil and Gas Separator, Sep. 30, 2009; Retrieved from the Internet: URL:http://www.oilngasseparator.info/wp-content/uploads/2009/09/crude-viscocity-graph.JPG; retrieved on Aug. 12, 2016.

* cited by examiner

METHOD FOR PRESSURIZING THE INNER FLOW SPACE OF A FLEXIBLE PIPE INTENDED FOR TRANSPORTING HYDROCARBONS

CROSS-REFERENCE TO RELATED APPLICATIONS

The present application is a 35 U.S.C. §§ 371 national phase conversion of PCT/EP2016/075753, filed Oct. 26, 2016, which claims priority of French Patent Application No. 15 60255, filed Oct. 27, 2015, the contents of which are incorporated by reference herein. The PCT International Application was published in the French language.

TECHNICAL FIELD

The present invention relates to a method for pressurizing the inner flow space of a flexible pipe intended for transporting hydrocarbons in deep water.

TECHNICAL BACKGROUND

Flexible pipes may be used at a great depth, typically up to 3000 meters deep. They allow the transport of fluids, in particular hydrocarbons, having a temperature typically reaching 130° C. and even able to exceed 150° C., and an inner pressure that may reach 100 MPa (1000 bar), or even 150 MPa (1500 bar).

Flexible pipes for transporting hydrocarbons generally include, from the outside toward the inside of the pipe, a reinforcing layer and a polymer sheath.

The polymer sheath provides the sealing of the pipe. The component material of the polymer sheath should be chemically stable and capable of mechanically withstanding the transported fluid and its characteristics (composition, temperature and pressure). The material of the polymer sheath should combine characteristics of ductility, longevity (generally, the pipe must have a lifetime of at least 20 years), mechanical strength, heat resistance and pressure resistance. This material should in particular be chemically inert with respect to chemical compounds making up the transported fluid. Typically, the transported hydrocarbons comprise crude oil, water and pressure gases. Various polymer materials such as polyolefins, polyamides, polyamide 11, or fluorinated polymers, such as polyvinylidene fluoride (PVDF), are typically used in the polymer sheath of flexible pipes.

The reinforcing layer gives the pipe its resistance to radial forces. It is made up of wound longitudinal elements, typically a winding of metal wire with non-contiguous turns, so as to guarantee the flexibility of the flexible pipe. A space, called "butt gap", therefore exists between each turn of the reinforcing layer. The shape and the size (width, depth) of the butt gap depends on the shape of the wire, its thickness and the placement pitch (FIG. 2).

According to the industrial standards in force, a flexible pipe intended to transport hydrocarbons must undergo, before marketing, a factory acceptance test (FAT), which is a pressurization test of the inner flow space of the flexible pipe. This test is carried out under conditions harsher than the usage conditions of the flexible pipe in order to anticipate any defect of the flexible pipe. The test is described in paragraph 10.3 of standard API 17J (3rd edition—Jan. 1, 2009). During this test, the inner space of the pipe is filled with water, then is pressurized, this pressure being exerted by the water. The pressure of the test is typically 1.3 times the design pressure, where the design pressure is as defined in the standard above. For a flexible pipe for the underwater transport of hydrocarbons, the design pressure may in some cases be greater than or equal to 68 MPa (680 bars), the factory acceptance test therefore being carried out at a pressure greater than or equal to 100 MPa (1000 bar) (15 kPSI). This test typically consists of two pressurization cycles.

Under the effect of the pressure inside the pipe, the polymer sheath, which is relatively flexible, is pressed against the inner face of the reinforcing layer. The part of the polymer sheath that is not locally supported by the reinforcing layer (i.e., the part across from the butt gap) deforms under the effect of the pressure (FIG. 5). This deformation phenomenon of the polymer sheath in the butt gaps of the reinforcing layer is called creep or extrusion of the polymer sheath. This deformation is greater when:
 the pressure is high,
 the temperature is high, and
 the thickness of the polymer sheath is small.

At the internal pressure of the factory acceptance test, the deformation of the polymer sheath in the butt gap is considerable. In many cases, the deformation level is such that the butt gap of the reinforcing layer is completely filled (i.e., the creep height is equal to the depth of the butt gap).

Under these conditions, these deformations may cause the appearance of cavitation and/or crazing on the polymer sheath. Cavitation is the appearance and/or growth of microvoids in the material in response to a mechanical stress (deformation). This phenomenon may or may not be associated with whitening of the material. The crazing phenomenon appears when the deformation is such that the cavitation alone no longer suffices to accommodate the deformation. Over time, this cavitation and/or crazing may lead to the appearance of cracks and a loss of sealing of the polymer sheath.

Application EP 2,653,291 describes methods for preparing a flexible pipe comprising a polymer sheath and a reinforcing layer present on the outer surface of the polymer sheath, comprising:
 either filling the pipe with a fluid, typically water, then pressurizing it at a temperature greater than the ambient temperature, typically around 40° C.,
 or filling the pipe with a chemical product, then pressurizing it. The chemical product may be a hydrocarbon oil, a fluid, a solvent, an ionic liquid or a supercritical liquid, preferably acetone.

These methods are described as making it possible to reduce the appearance of cavitation and crazing on the polymer sheath during the internal pressurization of the flexible pipe.

Tests have been done by the inventor of the present application by a using water to fill a pipe comprising a PVDF sheath covered with a reinforcing layer and subjecting it to a pressure of 120 MPa (1200 bar) at a temperature greater than or equal to 40° C. These tests have made it possible to confirm that pressurization at these temperatures makes it possible to decrease the cavitation phenomenon. Cavitation marks remain after pressurization, and local crazing marks are observed. Thus, the cavitation and crazing remain even after pressurization of the inner flow space of the flexible pipe at a temperature greater than the ambient temperature.

SUMMARY OF THE INVENTION

The development of a method for pressurizing the inner flow space of a pipe making it possible to reduce, or even prevent, cavitation and crazing is therefore desired.

To that end, according to a first object, the invention relates to a method for pressurizing the inner flow space of an underwater flexible pipe intended for transporting hydrocarbons, comprising the following steps:

a) providing a flexible pipe comprising a reinforcing layer made up of a short-pitch winding of at least one metal wire with noncontiguous turns around a thermoplastic polymer sheath defining an inner space, then
b) filling the inner space of the flexible pipe with an oil, then
c) increasing the inner pressure Pi of the flexible pipe to at least 10 MPa, the inner pressure being exerted by said oil, then
d) maintaining the inner pressure Pi of the flexible pipe at a pressure of at least 10 MPa for a time D of at least one minute, in particular at least one hour, preferably at least two hours, characterized in that said oil has a kinematic viscosity at 40° C., measured according to the ASTM D445 standard, of more than 10 mm$^2$/s.

Against all expectations, the inventor of the present application has demonstrated that increasing the kinematic viscosity of the fluid used to apply the inner pressure Pi makes it possible to limit, or even eliminate the appearance of cavitation and crazing. It has been observed that, during the inner pressurization Pi of the pipe by an oil whose kinematic viscosity is as defined above, the polymer sheath deforms in the butt gap, but without forming cavitations (or forming less than when the fluid does not have such a kinematic viscosity).

Unexpectedly, it has been observed that for oils with a high viscosity, the polymer sheath had the ability to deform without forming any cavitation (FIG. 6). This phenomenon is not fully explained, but it appears that it comes from the plasticizing effect of this type of oil.

Within the meaning of the present application, the following definitions are used:
"inner pressure": the pressure exerted inside the flexible pipe by the fluid that it contains,
"design pressure": the design pressure as defined in the API 17J standard dated Jan. 1, 2009,
"oil": a liquid fluid at ambient temperature (around 20° C.) at a pressure of 10 MPa. Generally, the oil is liquid at ambient temperature (around 20° C.) at atmospheric pressure (around 1 bar). Preferably, the oil is liquid at 0° C. at atmospheric pressure (around 1 bar).

The method comprises a step a) for providing a flexible pipe. The flexible pipe comprises, from the outside toward the inside:
a reinforcing layer made up of a short-pitch winding of at least one metal wire with noncontiguous turns, and
a thermoplastic polymer sheath defining an inner space.
This inner space is the inner flow space that makes it possible to transport the hydrocarbons.

Preferably, the polymer sheath comprises a thermoplastic polymer, in particular chosen from among polyolefins, polyamides, homopolymers of polyvinylidene fluoride (PVDF) and copolymers of vinylidene fluoride and of at least one other monomer (i.e., other than vinylidene fluoride), preferably chosen from among the following monomers: hexafluoropropylene (HFP), chlorotrifluoroethylene (CTFE), tri-fluoroethylene (TrFE), perfluoro(methylvinyl) ether, perfluoro(ethylvinyl)ether, perfluoro(propylvinyl) ether, tetrafluoroethylene, perfluorobutylethylene, fluoropropylene, chlorodifluoroethylene, chlorofluoroethylene, fluoroethylene, and the monomer with the following formula: $CH_2=CH-CF_2-(CF_2)_4-CF_3$.

The polymer sheath typically comprises at least 50% by weight of thermoplastic polymer. The polymer sheath may also comprise fillers, for example:
between 0 and 50% by weight of conducting mineral fillers, such as carbon nanotubes,
between 0 and 50% by weight of polyhedral oligomeric silsesquioxane (POSS) in order to increase the mechanical properties of the polymer sheath, more particularly its creep resistance,
compounds chemically active with acid compounds (generally $H_2S$ or $CO_2$) so as to irreversibly neutralize the corrosive effects of said acid compounds.

The polymer sheath is typically tubular, generally has a diameter from 50 mm to 600 mm, preferably from 50 to 400 mm, a thickness from 1 mm to 150 mm, preferably from 40 to 100 mm, and a length from 1 m to 10 km.

The reinforcing layer is made up of a winding of metal wire with noncontiguous turns, preferably with a short pitch. In the present application, the concept of short-pitch winding refers to any helical winding with a helix angle close to 90°, typically comprised between 75° and 90°.

The method may comprise, before step a), a step $a_0$) for preparing flexible pipe, typically comprising:
an extrusion to form a polymer sheath, the extrusion being done on another layer (typically a carcass), then
assembling the polymer sheath with the reinforcing layer.

Preferably, step a0) for preparing the flexible pipe may comprise, after assembling the polymer sheath with the reinforcing layer, an additional sub-step for mounting connecting members at the ends of the flexible pipe. The connecting members are in particular end tips and in which each of the layers of the flexible pipe is inserted. Typically, these steps b), c) and d) are carried out just after having prepared the flexible pipe, generally before it is marketed. Indeed, the flexible pipes, after manufacturing and before marketing, undergo a pressure test in order to verify their resistance to the usage conditions. Thus, the method according to the invention may be carried out in the context of a pressure test. The pressure test may be done on the manufacturing site of the flexible pipe, for example in the context of a factory acceptance test (FAT) or an extended factory acceptance test (eFAT) or a shallow water test (SWT). The pressure test may also be done outside the manufacturing site, for example in the context of an integration test after installation of the flexible pipe on an offshore site (system integration test, SIT).

The method may comprise, before step b), a step b0) consisting of winding the flexible pipe on a spool or rack.

The method comprises a step b) consisting of filling the inner space of the flexible pipe with an oil whose kinematic viscosity at 40° C. measured according to the ASTM D445 standard dated Feb. 1, 2015 is greater than 10 mm$^2$/s.

The kinematic viscosity at 40° C. measured according to the ASTM D445 standard dated Feb. 1, 2015 for the oil used in the method is greater than 10 mm$^2$/s, generally greater than 100 mm$^2$/s, in particular greater than 250 mm$^2$/s, typically greater than 400 mm$^2$/s, preferably greater than 500 mm$^2$/s, for example greater than 750 mm$^2$/s.

Preferably, the oil is not miscible with water at ambient temperature.

Generally, the oil is a synthetic oil, preferably chosen from among a poly-alpha-olefin oil, a silicone oil, an oil-ester, an oil-polyester, and mixtures thereof.

In one preferred embodiment, the oil is a poly-alpha-olefin (PAO) oil (or a mixture of poly-alpha-olefin oils), in particular those provided by INEOS (in particular from the Durasyn® line), Chevron Philips Chemical (in particular from the SynFluid® $^{line}$), or Exxon mobil (in particular from the SpectraSyn™ line).

Examples in particular include:
- the Durasyn® 174 I oil (the kinematic viscosity of which at 40° C. measured according to the ASTM D 445 standard is 412 mm$^2$/s), the Durasyn® 180R oil (the kinematic viscosity of which at 40° C. measured according to the ASTM D 445 standard is 930 mm$^2$/s) and the Durasyn® 1801 oil (the kinematic viscosity of which at 40° C. measured according to the ASTM D 445 standard is 1286 mm$^2$/s), provided by INEOS,
- the SynFluid® mPAO 65 cSt oil (the kinematic viscosity of which at 40° C. measured according to the ASTM D 445 standard is 605 mm$^2$/s), the SynFluid® mPAO 100 cSt oil (the kinematic viscosity of which at 40° C. measured according to the ASTM D 445 standard is 1023 mm$^2$/s) and the SynFluid® mPAO 150 cSt oil (the kinematic viscosity of which at 40° C. measured according to the ASTM D 445 standard is 1719 mm$^2$/s), provided by Chevron Philips Chemical, and
- the SpectraSyn™ 40 oil (the kinematic viscosity of which at 40° C. measured according to the ASTM D 445 standard is 396 mm$^2$/s) and the SpectraSyn™ 100 oil (the kinematic viscosity of which at 40° C. measured according to the ASTM D 445 standard is 1240 mm$^2$/s), provided by Exxon mobil.

The method according to the invention comprises a step c) consisting of increasing the inner pressure Pi of the pipe up to at least 10 MPa, the inner pressure being exerted by the oil, then a step d) consisting of maintaining the inner pressure Pi of the flexible pipe at a pressure of at least 10 MPa for a time D of at least one minute, in particular at least one hour, preferably at least two hours.

Typically, the inner pressure Pi during steps c) and d) is greater than or equal to 20 MPa, in particular greater than or equal to 30 MPa, preferably greater than or equal to 40 MPa, for example greater than or equal to 50 MPa, 100 MPa or 150 MPa. The inner pressure Pi is generally less than 500 MPa.

The maintenance of the flexible pipe at the inner pressure Pi during step d) lasts at least one minute, in particular at least one hour, preferably at least two hours, typically at least ten hours, for example at least 24 hours. Preferably, the time D for which the flexible pipe is kept at the inner pressure Pi during step d) is greater than or equal to 24 hours. Generally, the time D for maintenance at the inner pressure Pi is less than 72 hours. The inner pressure Pi is considered to be maintained when the inner pressure decrease in the flexible pipe over one hour is less than 1%.

In one embodiment, during step d), the temperature of the oil is comprised between −5° C. and 30° C., typically ambient temperature (around 20° C.).

In another embodiment, during step d), the temperature of the oil is greater than 30° C., in particular greater than or equal to 40° C., and preferably less than 70° C. A temperature greater than or equal to 40° C. advantageously makes it possible to still further reduce the appearance of cavitation. Typically, the method then comprises, before step b), a step γ) consisting of heating the oil to a temperature greater than or equal to 40° C.

Generally, during step d), the inner pressure Pi of the flexible pipe, and optionally the temperature of the oil, are measured, typically either continuously, or at time intervals (for example no more than every 30 minutes). Generally, it is verified that the inner pressurization Pi of the pipe does not cause any excess of the usage factors of the flexible pipe beyond those defined in tables 6 and 7 of the API 17J standard dated Jan. 1, 2009. Typically, during step d), it is verified whether oil leaks outside the pipe are observed. If oil leaks are observed, the polymer sheath is no longer performing its sealing role.

Steps c) and d) can be repeated n times, where n is an integer greater than or equal to 1. Generally, n is less than 20, in particular less than 10. For example, n is equal to 1 (there are then 2 sequences, where a sequence consists of the series of steps c) and d)) or n is equal to 2 (there are then 3 sequences).

In one embodiment, the inner pressure Pi of the flexible pipe is different for each sequence. Typically, the inner pressure Pi is increased from one sequence to the next. The method may comprise, between two sequences, a step d1) consisting of decreasing the inner pressure Pi of the flexible pipe, typically to atmospheric pressure.

Typically, n is equal to 1. The method then comprises the following steps:
a) providing a flexible pipe comprising a reinforcing layer made up of a short-pitch winding of at least one metal wire with noncontiguous turns around a thermoplastic polymer sheath defining an inner space, then
b) filling the inner space of the flexible pipe with an oil, then
c) increasing the inner pressure Pi of the flexible pipe to at least 10 MPa, the inner pressure being exerted by said oil, then
d) maintaining the inner pressure Pi of the flexible pipe at a pressure of at least 10 MPa for a time D of at least one minute, in particular at least one hour, preferably at least two hours, then
d1) optionally decreasing the inner pressure Pi of the flexible pipe, typically to atmospheric pressure, then
c') increasing the inner pressure Pi' of the flexible pipe to a pressure greater than $Pi_1$, the inner pressure being exerted by said oil, then
d') maintaining the inner pressure Pi' of the flexible pipe at a pressure greater than $Pi_1$ for a time D of at least one minute, in particular at least one hour, preferably at least two hours.

In another embodiment, the inner pressure Pi of the flexible pipe is identical for each sequence. Typically, the method then comprises, between two sequences, a step d1) consisting of decreasing the inner pressure Pi of the flexible pipe, typically to atmospheric pressure.

Typically, n is equal to 1. The method then comprises the following steps:
a) providing a flexible pipe comprising a reinforcing layer made up of a short-pitch winding of at least one metal wire with noncontiguous turns around a thermoplastic polymer sheath defining an inner space, then
b) filling the inner space of the flexible pipe with an oil, then
c) increasing the inner pressure Pi of the flexible pipe to at least 10 MPa, the inner pressure being exerted by said oil, then
d) maintaining the inner pressure Pi of the flexible pipe at a pressure of at least 10 MPa for a time D of at least one minute, in particular at least one hour, preferably at least two hours, then
d1) decreasing the inner pressure Pi of the flexible pipe, typically to atmospheric pressure, then
c') increasing the inner pressure Pi of the flexible pipe to at least 10 MPa, the inner pressure being exerted by said oil, then d') maintaining the inner pressure Pi of the flexible pipe at a pressure of at least 10 MPa for a time D of at least one minute, in particular at least one hour, preferably at least two hours.

When the method comprises implementing several sequences, where a sequence consists of the series of steps c) and d), the temperature of the oil in each step d) may be identical to or different from that of the step d) that follows it.

When the steps c) and d) are repeated n times, the time D for maintenance at the inner pressure Pi of each step d) may be identical to or different from that of the step d) that follows it.

The method may comprise additional steps to those defined above.

For example, it may comprise, between steps b) and c), a step c0) consisting of pressurizing the inner space of the flexible pipe at an inner pressure $P_0$ below 10 MPa, then maintaining the inner space of the flexible pipe at the inner pressure $P_0$ for a time greater than 30 minutes. This step c0) is a preconditioning step. The maintenance time of the inner space of the flexible pipe at the inner pressure $P_0$ is greater than 30 minutes, in particular greater than 2 hours, for example greater than 24 hours. The inner pressure $P_0$ may for example be the atmospheric pressure (around 1 bar). Preferably, the preconditioning step c0) is carried out at a temperature of the polymer sheath greater than 30° C., or even greater than 60° C., and generally less than 70° C.

In one embodiment, the method comprises:
before step b), a step α) consisting of introducing, in the flexible pipe, a hose having a diameter smaller than the inner diameter of the flexible pipe, and
before step c), a step β) consisting of filling the hose with a fluid of a different nature from the oil (FIG. 4).

The length of the hose is generally greater than or equal to the length of the flexible pipe.

Typically, the fluid of step β) is an aqueous solution, such as water.

In this embodiment, during step b), only the space 405 between the hose and the flexible pipe is filled with oil as defined above. During step β), the space 404 that corresponds to the inside of the hose is filled with fluid. Steps b) and β) can be done in any order. This embodiment makes it possible to avoid filling the entire flexible pipe with oil, therefore to minimize the quantity of oil used, and is therefore particularly advantageous when the oil is expensive.

The hose is chosen in a material inert to both the fluid and the oil used. The hose may have any shape, and generally has a circular section. The hose may be made from a flexible material, and its section may only assume a circular shape when it is filled with fluid during step β).

In another embodiment, the method comprises, before step b) or simultaneously with step b), a step δ) consisting of inserting a solid material into the flexible pipe. This solid material may be introduced before step b) (before filling the pipe with oil) or simultaneously with step b) (typically, the introduced oil comprises the solid material). The solid material is chosen in a material inert to the oil used. It may be polymeric. Its dimensions and shape may be variable. For example, the material may be in the form of a polymer ring that has the advantage of being flexible. One thus avoids filling the entire flexible pipe with oil, therefore minimizing the quantity of oil used.

Generally, the method comprises, after step d), a step e) consisting of decreasing the inner pressure Pi of the flexible pipe, typically to atmospheric pressure, then optionally a step f) consisting of emptying the oil from the flexible pipe.

The flexible pipe may comprise, between the polymer sheath and the reinforcing layer, an anti-creep strip, which makes it possible to still further reduce the appearance of cavitation.

Preferably, the reinforcing layer is a pressure vault.

Preferably, the polymer sheath is an inner sealing polymer sheath.

The flexible pipe for transporting hydrocarbons used in the method according to the invention generally includes, from the outside toward the inside of the pipe:
an outer polymeric sealing sheath 10, typically to protect the entire pipe, and in particular to prevent seawater from penetrating its thickness,
one or more tensile armor ply(plies) 12, 14, generally two,
a pressure vault 18 (which corresponds to the reinforcing layer defined above),
an inner sealing polymeric sheath 20 (which corresponds to the polymeric sheath defined above), and
optionally, a metal carcass 22 (FIG. 1),
connecting members (not shown) at each end of the flexible pipe, said connecting members in particular including end tips.

If the flexible pipe comprises a metal carcass 22, it is said to have a rough bore. If the flexible pipe has no metal carcass 22, it is said to have a smooth bore. Generally, to transport hydrocarbons, a pipe including a carcass 22 is preferred, while a pipe with no carcass 22 will be appropriate for transporting water and/or pressurized steam.

The metal carcass 22 and the pressure vault 18 are made up of short-pitch wound longitudinal elements, and they give the pipe its resistance to radial forces while the tensile armor plies 12, 14 are made up of metal wires wound with long pitches to react the axial forces. In the present application, the concept of short-pitch winding refers to any helical winding with a helix angle close to 90°, typically comprised between 75° and 90°. The concept of long-pitch winding covers helix angles smaller than 60°, typically comprised between 20° and 60° for the tensile armor plies.

The nature, number, dimensioning and organization of the layers making up the flexible pipe are essentially related to their usage and installation conditions. The flexible pipe implemented in the method may comprise polymer and/or metal and/or composite layers in addition to those mentioned above between two adjacent layers.

For example, it may comprise:
a ring made by short-pitch winding of at least one metal wire advantageously with a cross-section around the pressure vault to increase the bursting strength of the pipe, and/or
a maintaining layer such as an aramid strip with a high mechanical strength (Technora® or Kevlar®) between the outer polymer sheath and the tensile armor plies, or between two tensile armor plies, and/or
optionally, one or more anti-wear layers made from a polymer such as plasticized or non-plasticized polyamide in contact either with the inner face of the aforementioned maintaining layer, or with its outer face, or with both faces, this anti-wear layer making it possible to prevent the maintaining layer from wearing out in contact with the metal reinforcements. The anti-wear layers, which are well known by those skilled in the art, are generally made by helical winding of one or more strips obtained by extruding a polymeric material based on polyamide, polyolefins, or PVDF polyvinylidene fluoride). Reference may also be made to document WO 2006/120320, which describes antiwear layers made up of ribbons of polysulfone (PSU), polyether sulfone (PES), polyphenol sulfone (PPSU), polyetherimide (PEI), polytetrafluoroethylene (PTFE), polyether ether ketone (PEEK) or polyphenylene sulfide (PPS).

The flexible pipe used in the method according to the invention is in particular suitable for transporting fluids, in particular hydrocarbons in sea beds, and at great depths. More specifically, it is said to be of the unbonded type, and it is thus described in the normative documents published by the American Petroleum Institute (API), API 17J ($3^{rd}$ edition—Jan. 1, 2009) and API RP 17B ($3^{rd}$ edition—March 2002).

The method according to the invention advantageously makes it possible to:
  replace the factory acceptance test according to paragraph 10.3 of the API 17J standard (3rd edition—Jan. 1, 2009) with a method in which the appearance of cavitation or crazing on the polymer sheath is decreased, or even eliminated,
  extend the scope of application of the polymer sheath to high pressures. Indeed, today, certain polymer materials are not used as inner polymer sheath because the oil cavitation and/or crazing appearing when such a sheath is pressurized cause a loss of sealing.
  reduce, or even prevent, cavitation and crazing without having to alter the nature of the layers of the flexible pipe, the preparation method for each of its layers and the assembly method of these layers. The method according to the invention is therefore very easy to implement, and therefore inexpensive.

According to a second object, the invention relates to an underwater flexible pipe able to be obtained using the aforementioned method. Relative to a pipe not having undergone the method according to the invention, the pipe according to the invention differs by the absence of crazing on the thermoplastic polymer sheath and/or by a lower, or even nonexistent, cavitation rate. The sheath volume with cavitation is therefore smaller. The crazing and cavitation may in particular be observed with a scanning electron microscope (SEM). The cavitation rate is also related to a local density variation of the polymer sheath, which is measured according to the ASTM D792 standard dated Nov. 1, 2013. Typically, the density of the polymer sheath of an underwater flexible pipe having undergone the method according to the invention decreases by less than 5%, or even less than 2%, for example less than 1% relative to the density of this polymer sheath before the implementation of the method. As a comparison, the density of the polymer sheath of an underwater flexible pipe having undergone a factory acceptance test (FAT) as described in paragraph 10.3 of the API 17J standard (3rd edition—Jan. 1, 2009) decreases by more than 5% relative to the density of this sheath before this test.

According to a third object, the invention relates to the use of the aforementioned underwater flexible pipe for transporting hydrocarbons.

According to a fourth object, the invention relates to a device allowing the inner pressurization of an underwater fluid pipe intended to transport hydrocarbons comprising:
i) a flexible pipe comprising a reinforcing layer made up of a short-pitch winding of at least one metal wire with noncontiguous turns around a thermoplastic polymer sheath defining an inner space, said pipe typically being designed to remain sealed when the pressure in the inner space reaches a value equal to 10 MPa,
ii) a piece of equipment for giving the flexible pipe an inner pressure Pi of at least 10 MPa, and
iii) a piece of equipment for maintaining the inner pressure Pi of the flexible pipe for a time D of at least one minute, in particular at least one hour, preferably at least two hours,
characterized in that said piece of equipment for giving the flexible pipe an inner pressure Pi is an oil comprising a kinematic viscosity at 40° C., measured according to the ASTM D445 standard, of more than 10 mm$^2$/s.

This device makes it possible to carry out the process according to the invention. The device is typically a pressure test installation, for example a factory acceptance test installation, an extended factory acceptance test installation, a shallow water test installation or an integration test installation after the installation of the flexible pipe on the offshore site.

Generally, the flexible pipe is connected to the piece of equipment to give it an inner pressure Pi of at least 10 MPa. This piece of equipment typically comprises:
  two valves (which are used to close off the inner space of the flexible pipe) (typically, each of the ends of the flexible pipe is connected to a valve), and
  a pump (which makes it possible to pressurize the oil located in the inner space of the pipe and keep it pressurized),
  optionally, a non-underground reservoir (which makes it possible to store the oil).

Preferably, the flexible pipe is connected to said piece of equipment to pressurize the inside of the flexible pipe at the pressure Pi of at least 10 MPa via connecting members, said connecting members in particular including end tips.

In one embodiment, the device comprises:
i) the flexible pipe comprising a reinforcing layer made up of a short-pitch winding of at least one metal wire with noncontiguous turns around a thermoplastic polymer sheath defining an inner space,
ii) a piece of equipment for giving the flexible pipe an inner pressure Pi of at least 10 MPa, and
iii) a piece of equipment for maintaining the inner pressure Pi for a time D of at least one minute, in particular at least one hour, preferably at least two hours,
characterized in that:
  said piece of equipment for giving the flexible pipe an inner pressure Pi is an oil comprising a kinematic viscosity at 40° C., measured according to the ASTM D445 standard, of more than 10 mm$^2$/s, and
  the inner pressure Pi of the flexible pipe is at least 10 MPa.

Other particularities and advantages of the invention will emerge from reading the following description of particular embodiments of the invention, provided for information but non-limitingly, in reference to the figures.

BRIEF DESCRIPTION OF THE DRAWINGS

FIG. 1 is a partial schematic perspective view of a flexible pipe that may be used in the method according to the invention and comprising, from the outside toward the inside:

Figure 1:
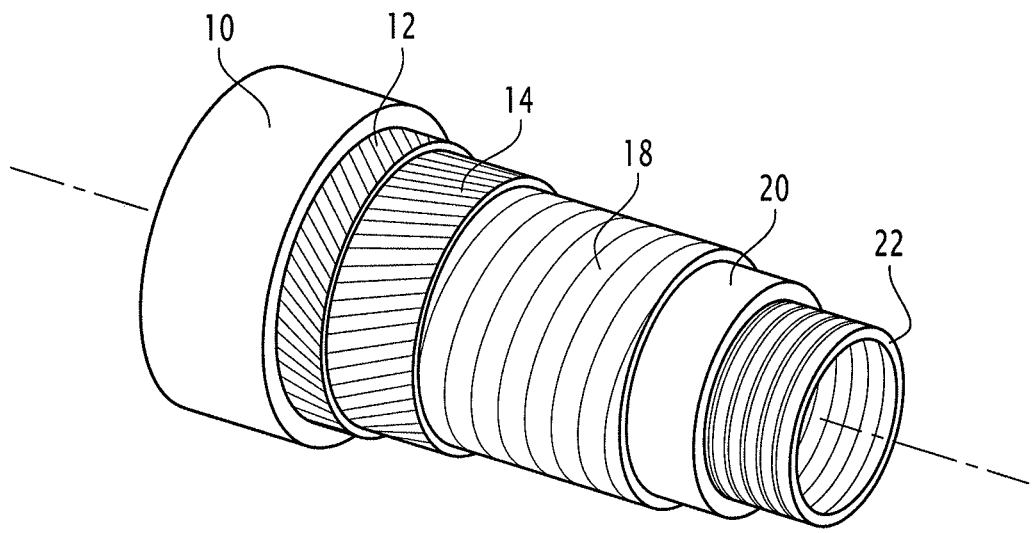
FIG. 1 is a partial schematic perspective view of a flexible pipe that may be used in the method according to the invention.

an outer sealing polymer sheath 10, an outer tensile armor ply 12, an inner tensile armor ply 14 wound in the opposite direction from the outer tensile armor ply 12, a pressure vault 18 for reacting radial forces generated by the pressure of the transported hydrocarbons, an inner sealing polymer sheath 20, and an inner carcass 22 for reacting radial crushing forces.

No intermediate polymer sheath is shown in FIG. 1. As explained above, it is not outside the scope of the present invention if the pipe comprises one or several intermediate polymer sheath(s).

Due to the presence of the inner carcass 22, this pipe is said to have a rough bore. The method according to the invention can also be implemented with a so-called smooth-bore pipe, not including an inner carcass.

Likewise, it would not be outside the scope of the present invention to eliminate the pressure vault 18, as long as the helix angles of the wires making up the tensile armor plies 12, 14 are close to 55° and in opposite directions.

The tensile armor plies 12, 14 are obtained by long-pitch winding a set of metal or composite wires, with a generally substantially rectangular section. The invention would also apply if these wires had a circular or complex geometry section, for example of the self-stapled T type. In FIG. 1, only two tensile armor plies 12 and 14 are shown, but the pipe could also include one or several additional pairs of reinforcements. The tensile armor ply 12 is said to be outer because here it is the last, starting from the inside of the pipe, before the outer sealing sheath 10.

The flexible pipe may also comprise layers not shown in FIG. 1, such as:

a ring made by short-pitch winding of at least one metal wire advantageously with a cross-section around the pressure vault 18 to increase the bursting strength of the pipe, and/or a maintaining layer between the outer polymer sheath 10 and the tensile armor plies 12 and 14, or between two tensile armor plies, and/or one or more anti-wear layers made from a polymer in contact either with the inner face of the aforementioned maintaining layer, or with its outer face, or with both faces, this anti-wear layer making it possible to prevent the maintaining layer from wearing out in contact with the metal reinforcements. The anti-wear layers, which are well known by those skilled in the art, are generally made by helical winding of one or more strips obtained by extruding a polymeric material based on polyamide, polyolefins, or PVDF polyvinylidene fluoride). Reference may also be made to document WO 2006/120320, which describes anti-wear layers made up of ribbons of polysulfone (PSU), polyether sulfone (PES), polyphenol sulfone (PPSU), polyetherimide (PEI), polytetrafluoroethylene (PTFE), polyether ether ketone (PEEK) or polyphenylene sulfide (PPS).

Figure 2:
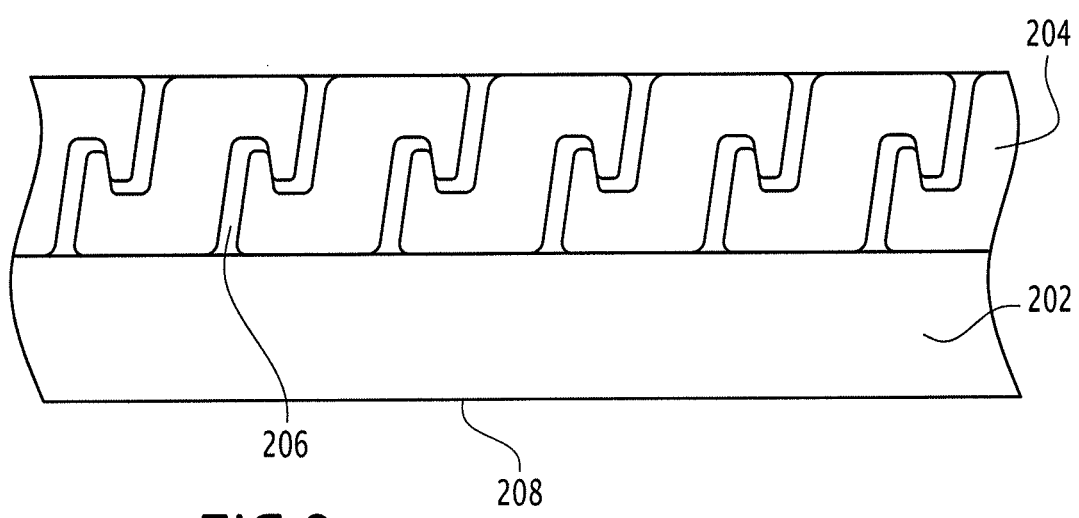
FIG. 2 is a sectional view of the polymer sheath and the reinforcing layer made up of a wound wire with noncontiguous turns.

FIG. 2 is a sectional view of the polymer sheath 202 and the reinforcing layer made up of a wound wire with non-contiguous turns 204. The surface 208 of the polymer sheath 202 is on the inner side of the pipe. A butt gap 206 exists between each turn of the reinforcing layer 204.

Figure 3:
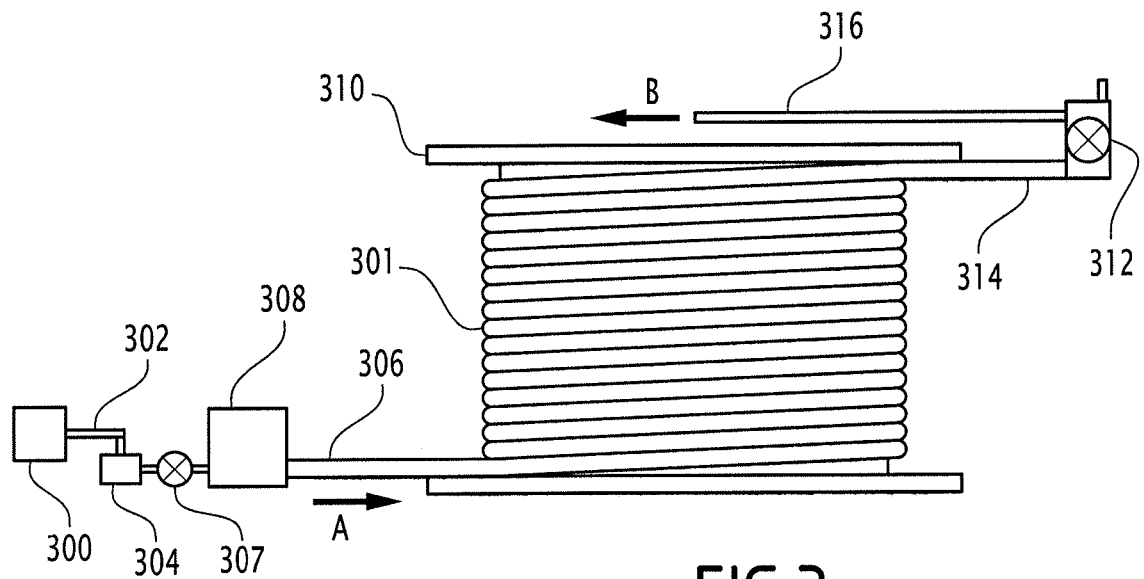
FIG. 3 illustrates an installation suitable for carrying out the method.

FIG. 3 illustrates an installation suitable for carrying out the method.

The oil is steered to the inside of the first end 306 of the flexible pipe 301 through a pump 308 (in the direction of arrow A). The flexible pipe 301 is wound on a spool 310 during the method.

When the method is carried out at a temperature higher than the ambient temperature (where the ambient temperature is the outside temperature in the test zone (i.e., temperature on the manufacturing site of the pipe), the installation typically comprises a heating device 304 connected on the one hand to an oil inlet pipe 302 and on the other hand to a supply valve 307. This heating element is not necessary when the method is carried out at ambient temperature.

The oil is pumped inside the inner space of the flexible pipe 301 from an oil reservoir 300 connected to the oil inlet pipe 302. The flexible pipe 301 is also connected to a pressure gauge that makes it possible to check the inner pressure Pi. A supply valve 307 is located between the heating device 304 and the pump 308. The flexible pipe 301 is aerated by an isolating valve 312 that in particular makes it possible to bleed the air from the flexible pipe 301. The oil that leaves the second end 314 of the flexible pipe 301 can be reintroduced through the pump 308 (in the direction of arrow B owing to the pipe 316, only part of which is shown). Next, the second end 314 of the flexible pipe 301 is closed using an isolating valve 312 and the flexible pipe 301 is pressurized owing to the pump 308 to the desired inner pressure Pi, and kept at this pressure for the desired time owing to the closing of the two valves 307, 312. Once this time has elapsed, the isolating valve 312 can be reopened to decrease the pressure inside the flexible pipe 301 to atmospheric pressure (about 1 bar).

Figure 4:
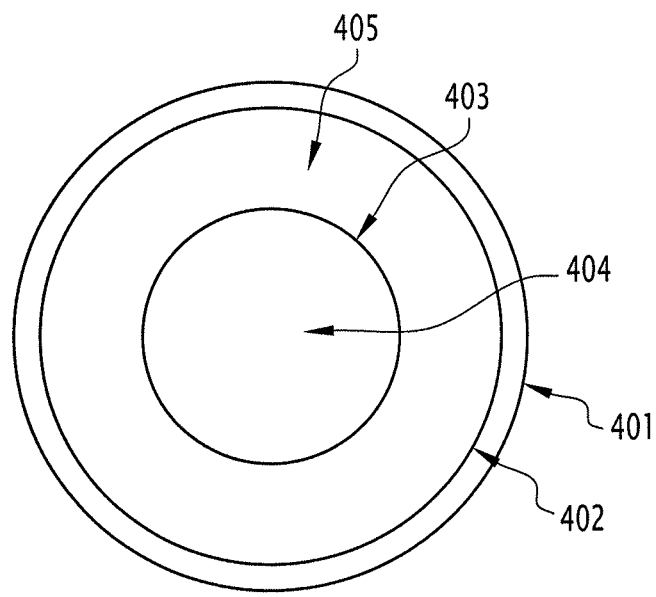
FIG. 4 is a sectional view of the flexible pipe comprising a reinforcing layer and a polymer sheath in an embodiment of the method.

FIG. 4 is a sectional view of the flexible pipe comprising a reinforcing layer 401 and a polymer sheath 402 in the embodiment of the method in which a hose 403 has been inserted into the pipe (step α)). During step b), the space 405 between the hose and the flexible pipe is filled with oil as defined above. During step β), the space 404 that corresponds to the inside of the hose is filled with fluid.

Figure 5:
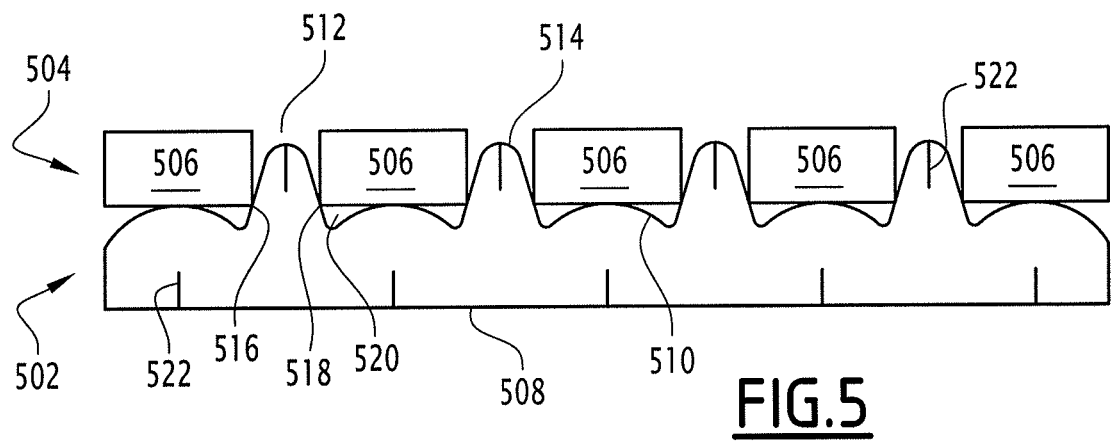
FIG. 5 is a sectional view of the polymer sheath and the reinforcing layer.

FIG. 5 is a sectional view of the polymer sheath 502 and the reinforcing layer 504 made up of a wound wire with noncontiguous turns 506 of a flexible pipe subject to a factory acceptance test according to paragraph 10.3 of the API 17J standard (3rd edition—Jan. 1, 2009), i.e., by inwardly pressurizing it with water (comparative). The inner surface 508 of the polymer sheath 502 is on the inner side of the pipe. The outer surface 510 of the polymer sheath 502 is on the outer side of the pipe. A butt gap 512 exists between each turn 506 of the reinforcing layer 504.

The outer surface 510 has local deformations at the butt gaps 512, and in particular radial deformations. Thus, the surface 510 has, aligned with the butt gaps 512, a massive excursion 514 of the polymer material inside the butt gaps 512 and on each side of the massive excursions 514, substantially aligned with the inner edges 516, 518 of the turns 506, a recess 520 of the polymer material. Indeed, under the action of the pressure, the polymer sheath 502 presses forcibly against the turns 506 of the reinforcing layer 504 and the polymer material creeps through the butt gaps 512. However, when one ceases to apply pressure, the material retracts at the inner edges 516, 518. This creep through the butt gaps 512 may lead to an unsticking of the polymer material within the massive excursions 514 and a withdrawal and damage of the material at the outer surface 510 of the polymer sheath 502. These phenomena manifest either during the factory acceptance test, or later when it is operating on the hydrocarbon production site. Furthermore, opposite the side of the inner surface 508 of the polymer sheath 502, flaws 522 are observed due to the cavitation phenomenon. These phenomena are related to the pressurization of the inside of the flexible pipe.

Against all expectations, the pressurization of the inner space of the flexible pipe by an oil as defined above makes it possible not only to reduce the damage phenomena of the outer surface 510 at the butt gaps 512, but also the consequences of the cavitation phenomena. Indeed, as explained below in reference to FIG. 6, by replacing the water with oil as defined above, the withdrawal at the inner edges 516, 518 of the butt gaps 512 as well as the spreading of the flaws 522 present in the excursions 514 and at the inner face 508 of the polymer sheath 502 are minimized.

Figure 6:
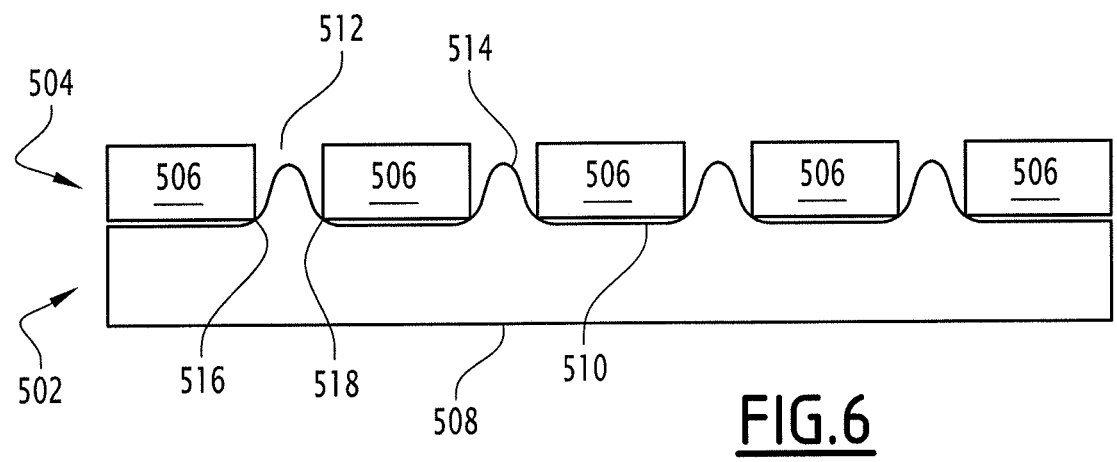
FIG. 6 is another sectional view of the polymer sheath and the reinforcing layer.

FIG. 6 is a sectional view of the polymer sheath 502 and the reinforcing layer 504 made up of a wound wire with noncontiguous turns 506 of a flexible pipe subject to the method according to the invention, i.e., inwardly pressurizing it with an oil as defined above. It is observed that on each side of the butt gaps 512, the outer surface 510 of the polymer sheath 502 is tangent to the inner edges 516, 518 of the turns 506, and that the withdrawn zones, as illustrated in FIG. 5, have disappeared. Furthermore, within the excursions 514 and on the side of the inner surface 508 of the polymer sheath 502, no traces of cavitation phenomena appear anymore, or unsticking zones previously observed.

Replacing the water with an oil as defined above makes it possible to fill the inside of the butt gaps 512 while minimizing the inner stresses in the polymer material. This minimization of the stresses makes it possible not to generate cavitation.

Figure 7:
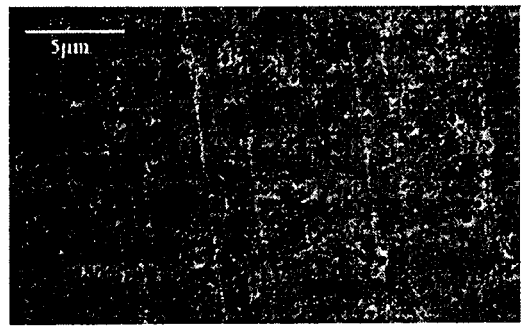
FIG. 7 is an image obtained by observation with a scanning electron microscope, the inner skin of the inner sealing polymer sheath of the flexible pipe of the example.

FIG. 7 is an image obtained by observation with a scanning electron microscope (SEM) with a magnification of ×5000 of the inner skin of the inner sealing polymer sheath of the flexible pipe of the example and which has not been pressurized (reference).

Figure 8:
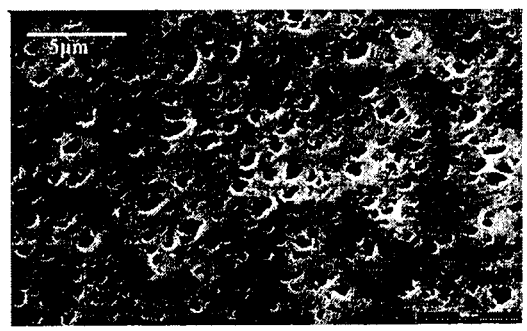
FIG. 8 is another image obtained by observation with a scanning electron microscope of the inner skin of the inner sealing polymer sheath of the flexible pipe.

FIG. 8 is an image obtained by observation with a scanning electron microscope (SEM) with a magnification of ×5000 of the inner skin of the inner sealing polymer sheath of the flexible pipe of the example and which has been pressurized, the pressure having been exerted by water (comparative).

Figure 9:
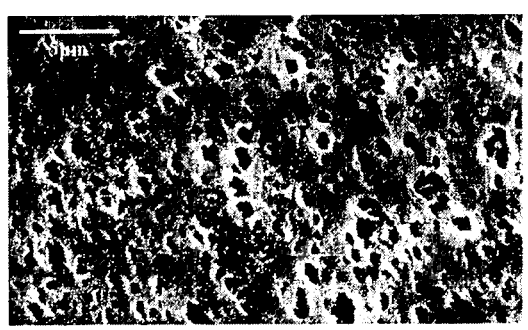
FIG. 9 is another image obtained by observation with a scanning electron microscope of the inner skin of the inner sealing polymer sheath of the flexible pipe.

FIG. 9 is an image obtained by observation with a scanning electron microscope (SEM) with a magnification of ×5000 of the inner skin of the inner sealing polymer sheath of the flexible pipe of the example and which has been pressurized, the pressure having been exerted by Marcol 52 oil (comparative).

Figure 10:
FIG. 10 is another image obtained by observation with a scanning electron microscope of the inner skin of the inner sealing polymer sheath of the flexible pipe.

FIG. 10 is an image obtained by observation with a scanning electron microscope (SEM) with a magnification of ×5000 of the inner skin of the inner sealing polymer sheath of the flexible pipe of the example and which has been pressurized, the pressure having been exerted by Durasyn 174I oil (according to the invention).

EXAMPLES

Pressurization tests with two pressure maintenance sequences (n=1) were done with three different fluids, the natures, densities and viscosities of which are provided in table 1.

TABLE 1 density and kinematic viscosity of the three tested fluids

| | measuring method | water | Marcol 52 oil | Durasyn 174I oil |
|---|---|---|---|---|
| kinematic viscosity at 40° C. (mm$^2$/s) | ASTM D 445 | 0.66 | 7.50 | 412 |
| kinematic viscosity at 100° C. (mm$^2$/s) | ASTM D 445 | 0.29 | 2.20 | 50 |
| density at 20° C. | ASTM D 4052 | 1 | 825 to 834 | 846 |

The three identical ST 63.60103 (Technip) flexible pipes used:
comprised, from the outside toward the inside of the pipe:
an outer sealing polymer sheath (10),
one or more tensile armor ply(plies) (12, 14),
a pressure vault (18),
an inner sealing polymer sheath (20) made from weakly plasticized PVDF (Gammaflex® TP22) (inner diameter of 77.50 mm), and
a metal carcass (22),
had an initial length of the flexible pipe (with tips) of 5.67 m, an inner diameter of 2.5", an outer diameter of 142 mm, a high design pressure (702 bar) and a factory acceptance test (FAT) pressure of 1054 bar.
The tests were done at a temperature of 20° C.
Each flexible pipe was wound on a spool, the radius R of which was 672 mm (radius chosen so as to have a deformation level on the stretched generatrix of the PVDF polymer sheath greater than 5%). The initial deformation level on the inner skin of the pressure sheath was 5.22%.
At the end of this phase, the inner space of the flexible pipe was connected to valves and to a pump, then filled with test fluid at atmospheric pressure for at least 24 hours. The following steps were then carried out:
Pressure increase at 5 bar/min to 850 bar, then 1 bar/min to Pi=1054 bar.
Maintenance of the pressure at Pi=1054 bar for 1 hour.
Depressurization from 1054 bar to 1 bar with a depressurization speed of 100 bar/hour.
Pressure increase at 5 bar/min to 850 bar, then 1 bar/min to Pi=1054 bar.
Maintenance of the pressure at Pi=1054 bar for 24 hours.
Depressurization from 1054 bar to 1 bar with a depressurization speed of 100 bar/hour.
Emptying of the inner space of the flexible pipe.
The flexible pipe was then unwound and straightened.
The flexible pipe was then dissected starting from the last layer (outer sheath) to the inner polymer sealing sheath.
The inner polymer sealing sheath was next removed in a zone corresponding to a winding greater than 5.0% and over the stretched generatrix.
The inner polymer sealing sheath was then characterized at the inner skin. An observation by scanning electron microscope (SEM) (JEOL JSM 6390-LV apparatus) with a magnification of ×5000 made it possible to compare the condition of the material in this zone on the micron scale, in order to observe the evolution of the cavitation rate.

The results of the SEM observations obtained on an untested sheath (reference) and on the sheaths removed on the 3 tested flexible pipes with the 3 fluids are shown in FIGS. 7 to 10.

From these snapshots, it is possible to conclude that:
a pressurized test on a flexible pipe done with water or the Marcol 52 oil causes a significant increase in the cavitation rate of the PVDF sheath.
a pressurized test on a flexible pipe done with the Durasyn 174I oil does not cause a significant increase in the cavitation rate of the PVDF sheath.

The invention claimed is:

1. A method for pressurizing testing the inner flow space of an underwater flexible pipe intended for transporting hydrocarbons, comprising:
   a) providing a flexible pipe comprising a reinforcing layer made up of a short-pitch winding of at least one metal wire with noncontiguous turns around a thermoplastic polymer sheath defining an inner space, then
   b) filling the inner space of the flexible pipe with an oil exerting an inner pressure $P_i$ inside the flexible pipe, then
   c) increasing an inner pressure $P_i$ of the flexible pipe to at least 10 MPa, the inner pressure being exerted by said oil, then
   d) maintaining the inner pressure $P_i$ of the flexible pipe at a pressure of at least 10 MPa for a time D of at least one minute,
   wherein said oil has a kinematic viscosity at 40° C., measured according to the ASTM D445 standard, of more than 10 mm²/s, the method being carried out in the context of a pressure test.

2. The method according to claim 1, wherein during the steps c) and d), the inner pressure $P_i$ is greater than or equal to 20 MPa.

3. The method according to claim 1, wherein the kinematic viscosity at 40° C. measured according to the ASTM D445 standard is greater than 100 mm²/s.

4. The method according to claim 1, wherein the time D of maintaining the step d) is at least one hour.

5. The method according to claim 1, wherein during the maintaining step d), the oil has a temperature comprised between −5 and 30° C.

6. The method according to claim 1, wherein during the maintaining step d), the oil has a temperature higher than 30° C.

7. The method according to claim 1, further comprising: before the filing step b), performing a step $b_0$ of winding the flexible pipe on a spool or rack.

8. The method according to claim 1, wherein the steps of c) increasing and of d) maintaining are repeated n times, where n is an integer greater than or equal to 1.

9. The method according to claim 1, further comprising, between the steps of b) filling and c) increasing, performing a step $c_0$) of pressurizing the inner space of the flexible pipe at an inner pressure $P_0$ below 10 MPa, and then performing a step $d_0$) of maintaining the inner space of the flexible pipe at the inner pressure $P_0$ for a time greater than 30 minutes.

10. The method according to claim 1, further comprising:
   before the step of b) filling, performing a step α) of introducing, in the flexible pipe, a hose having a diameter smaller than the inner diameter of the flexible pipe, and
   before the step of c) increasing, performing a step β) of filling the hose with a fluid different from the oil that is used for filling the inner space of the flexible pipe at b) the filling step.

11. The method according to claim 1, (the rest of limitations are not presented here).

12. The method according to claim 1, (the rest of limitations are not presented here).

13. The method according to claim 1, wherein the oil is a synthetic oil.

14. The method according to claim 1, wherein the polymer sheath is made from polyolefin, polyamide, polyvinylidene fluoride homopolymer, or copolymer of vinylidene fluoride and of at least one other monomer.

15. The method according to claim 1, wherein the flexible pipe comprises, from the outside toward the inside of the pipe:
   an outer sealing polymer sheath,
   one or more tensile armor plies, (the rest of limitations are not presented here).

16. A pressure test installation allowing the inner pressurization of an underwater fluid pipe intended to transport hydrocarbons comprising:
   a flexible pipe comprising a reinforcing layer made up of a short-pitch winding of
   at least one metal wire with noncontiguous turns around a thermoplastic polymer sheath defining an inner space,
   an oil comprising a kinematic viscosity at 40° C., measured according to the ASTM D445 standard, of more than 10 mm²/s, said oil being located in the inner space of the pipe,
   a pump capable of pressurizing the oil to an inner pressure $P_i$ of at least 10 MPa, and
   at least one valve able to close off the inner space of the flexible pipe for maintaining the inner pressure $P_i$ of the flexible pipe for a time D of at least one minute.

17. The method according to claim 1, further comprising after performing the maintaining step d), performing a step e) of decreasing the inner pressure $P_i$ of the flexible pipe to atmospheric pressure, and then optionally performing a step f) of emptying the oil from the flexible pipe.

* * * * *